(12) United States Patent
Starodubov et al.

(10) Patent No.: US 8,098,438 B2
(45) Date of Patent: Jan. 17, 2012

(54) POWER MONITORING DEVICE FOR POWERFUL FIBER LASER SYSTEMS

(76) Inventors: Dmitry Starodubov, Webster, MA (US); Alexey Mamin, Siegen (DE); Denis V. Gapontsev, Worcester, MA (US)

(*) Notice: Subject to any disclaimer, the term of this patent is extended or adjusted under 35 U.S.C. 154(b) by 481 days.

(21) Appl. No.: 12/072,597

(22) Filed: Feb. 27, 2008

(65) Prior Publication Data

US 2009/0213363 A1    Aug. 27, 2009

(51) Int. Cl.
  *G02B 27/14* (2006.01)
  *G02B 27/10* (2006.01)
  *H01S 3/30* (2006.01)
  *H01S 3/13* (2006.01)

(52) U.S. Cl. ........ 359/629; 359/618; 372/6; 372/29.021

(58) Field of Classification Search .................. 359/618, 359/629; 372/6, 29.021, 38.01; 356/73.1
See application file for complete search history.

(56) References Cited

U.S. PATENT DOCUMENTS

| 6,249,626 | B1 | 6/2001 | Bergmann |
| 6,480,331 | B1 | 11/2002 | Cao |
| 6,546,168 | B1 | 4/2003 | Xie et al. |
| 2008/0050127 | A1* | 2/2008 | Sommer et al. ............... 398/212 |

* cited by examiner

*Primary Examiner* — Ricky Mack
*Assistant Examiner* — Mahidere Sahle

(57) ABSTRACT

A pig-tailed optical component used in a powerful fiber laser system is configured with a power monitor unit. The monitor unit has a plate-shaped beam splitter operative to reflect portions of at least one of respective forward and backreflected light signals, and multiple photo-detectors.

7 Claims, 2 Drawing Sheets

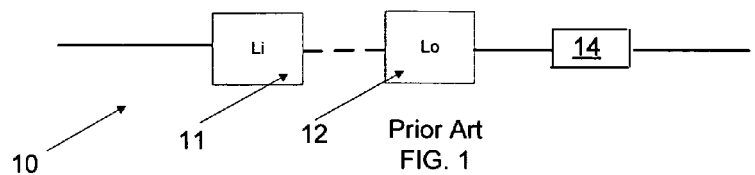
Prior Art
FIG. 1
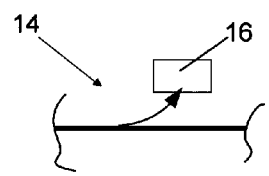
Prior Art
FIG. 2
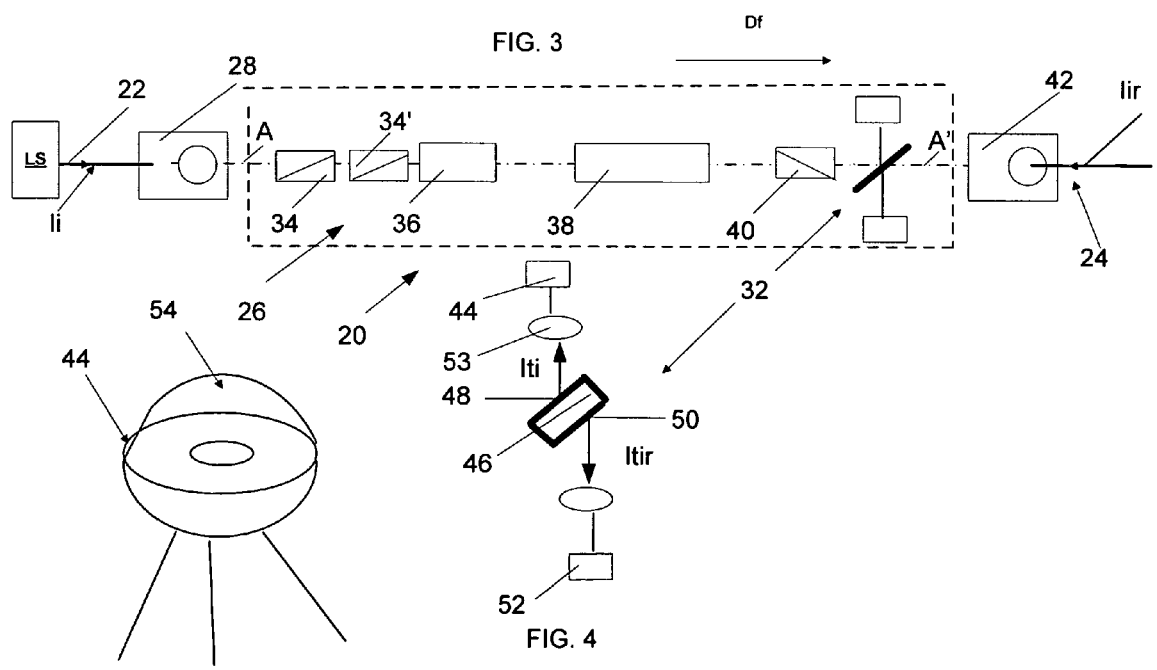

POWER MONITORING DEVICE FOR POWERFUL FIBER LASER SYSTEMS

BACKGROUND OF THE INVENTION

1. Field of the Invention

This invention relates to a powerful fiber laser system and, in particular, to an optical coupler configured to monitor the power of forward and backreflected light signals propagating along a light path in forward and backward directions, respectively.

2. Prior Art Discussion

A powerful fiber laser system typically includes one or more laser cascades and is capable of outputting tens and hundreds of watts. A light signal propagating along a powerful fiber laser system may vary within a broad range. The instability of the propagating signal detrimentally affects the task to be performed by a powerful laser system and the functionality of the system's components. To monitor the variation of power of light signals, optical laser systems are provided with taps. The purpose of such taps is to bleed off a small portion of optical signal so as to analyze the signal for desirable characteristics by a photo-detector.

Quite often, to prevent detrimental effect of light backreflection that may be caused by inner obstacles, such as splices coupling adjacent fibers, optical isolators are coupled between the cascades. The backreflection can be also caused by an outer obstacle, such as the surface to be processed during, for example, cutting and welding processes. Typically, a hybrid structure configured with an isolator and tap is installed in a powerful laser system The taps alone or in combination with isolators come in a variety of configurations. FIGS. 1 and 2, for example, illustrate a multi-cascaded fiber laser system 10 including an input cascade Li 11 and at least one output cascade Lo 12. A power monitor 14 preferably, but not necessarily, is coupled to the output of output cascade 12 and includes serially coupled an isolator core and a fiber tap. The fiber tap is configured with a fiber tap source and a photo detector 16, as illustrated in FIG. 2. Typically, detector 16 is located adjacent to a fiber bent or a taper where leaking light of the propagating signal may be sensed by detector 16. Based on multiple measurements, the stability of such a tap, i.e., the ratio between the measured power and the actual power of the propagating signal, is high and may reach about 10%. As a result, the measurement data of the actual power may be imprecise and lead to unsatisfactory performance of the laser system.

A need, therefore, exits for a power monitor operative to provide improved measurements of the power of light signals generated by a powerful laser system.

A further need exists for a photo detector configured to withstand relatively high powers of the tapped signal.

SUMMARY OF THE INVENTION

These needs are satisfied by a power monitor unit configured in accordance with the present disclosure. The disclosed powerful fiber laser system includes, among others, an isolator core provided with a tap component.

In accordance with one aspect of the disclosure, the monitor includes a semi-transparent plate entrained by light which propagates from an input fiber to an output fiber through an isolator core. The plate has two opposite faces, at least one of which is covered by a reflective coating. The coated face of the plate allows to reroute or tap a small portion of a forward propagating light and a backreflected propagating light, which is reflected from internal or external obstacles, to one or more photo detectors. Alternatively, the opposite faces can be covered by respective reflective coatings. As a consequence, one of the coated faces taps a forward propagating light, whereas the opposite face taps a portion of the backreflected light; the tapped lights are sensed by respective photo detectors. The configuration of the disclosed power monitor allows for the increased stability of the measurements.

The light tapped off by the plate is still quite powerful to saturate, destroy or, at least, cause a photometer to malfunction. Accordingly, in accordance with a further aspect of the disclosure, the face of the photometer has a diffuser substantially weakening the received light. As a result, the reliability of the disclosed system is improved.

BRIEF DESCRIPTION OF THE DRAWINGS

The above and other features and advantages of the disclosure will become more readily apparent from the following specific description accompanied by the drawings, in which:

FIG. 1 is a diagrammatic view of the known powerful fiber laser system provided with a power monitor;

FIG. 2 is a power monitor or hybrid isolator/tap unit configured in accordance with the prior art;

FIG. 3 is a power monitor unit used in a powerful fiber laser system configured in accordance with the present disclosure;

FIG. 4 an enlarged view of the power monitor of FIG. 3; and

FIG. 5 is a view of photo detector configured according to the present disclosure.

SPECIFIC DESCRIPTION

Figure 6A:
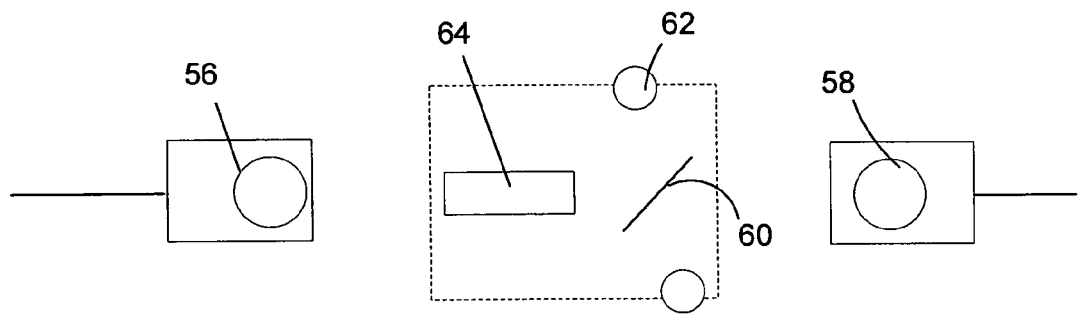
FIGS. 6A-6C are respective diagrammatic views illustrating various practical application of the power monitor unit of FIGS. 2-5.

Reference will now be made in detail to the disclosed system. Wherever possible, same or similar reference numerals are used in the drawings and the description to refer to the same or like parts or steps. The drawings are in simplified form and are far from precise scale.

FIG. 3 illustrates a signal power monitor system including a pigtailed linearly-polarized isolator 20 typically intended for use in a powerful laser system LS, which is shown in a highly diagrammatic manner and may include one or multiple cascades. The signal power monitor system is preferably coupled to the output cascade, but may be located between the cascades. The isolator 20 includes an upstream fiber 22 carrying a light signal Ii along a light path to a downstream fiber 24. Optically coupled between upstream and downstream fibers 22 and 24, respectively, is an isolator core 26, which is provided with a tap coupler monitor 32 and flanked by input and output collimators 28 and 42, respectively.

In operation, input signal Ii is emitted from input fiber 22 and focused by input collimator 28 so as to propagate in a forward direction Df through isolator core 26. The isolator core 26 has a well known structure including an upstream polarizer 34, a 45° optically active rotator element 36, a Faraday rotator 38 and an output polarizer 40 all optically connected to one another. The rotation of the plane of polarization provided by Faraday rotator 38 in one direction allows light to pass through both polarizers 34 and 40, respectively, which polarize light in orthogonal planes, whereas, in the opposite direction, the plane of polarization is rotated so that the passage of the light through isolator core 26 is blocked. As known, a polarizer is a device for producing light beam polarized in a specific direction. The input polarizer 34 is configured as a plate with a polarizing coating and is typically aligned to a linear polarization angle of input light Ii. The polarizing coating is important within the context of high power laser systems since it is capable of withstanding high powers without being destroyed. The isolator 20 may have an additional input polarizer 34' in order to provide for polarizing ability. The output polarizer 40 is aligned to a non-parallel polarization angle so as to transmit this polarization state at the angle of 90° or 0°, as known to one of ordinary skills sin the art.

Referring to FIG. 4 in addition to FIG. 3, tap coupler monitor 32 includes a splitter 46 optically coupled between output polarizer 40 and output collimator 42 and photo detectors 44 and 52, respectively. In the forward direction, splitter 46 is operative to branch a small portion, tap signal Iti, of Ii signal off its light path through a short-focal lens 53 to photodetector 44 capable of sensing tap signal Iti. The splitter 46 is configured as a rectangular plate having opposite faces 48 and 50 which extend in a non-orthogonal plane with respect to an optical axis A-A' of system 20. Note that splitter 46 can be installed at any location along the optical path between input and output collimators 28 and 42, respectively. Accordingly, the location of splitter 46 as shown in FIG. 3 is just exemplary.

In accordance with one embodiment, both faces 48 and 50 (FIG. 4) of splitter 46 are covered by respective anti-reflective coating films capable of reflecting only a small portion of forward light signal Ii and backreflected light signal Iir to respective photo-detectors 44 and 52, which are operative to simultaneously sense the forward propagating and backreflected lights. The experimental data shows that the stability of tap coupler monitor 32, that is a ratio Pti/Pi between the power Pti of tap signal Iti and the power Pi of light signal Ii, can be about 10% and even smaller, particularly, if the isolator is linearly polarized. As a result, the data regarding the power of input light signal Ii and, therefore, the data regarding the functionality of system 20 is substantially more reliable than in the known prior art of powerful laser systems.

Alternatively, either face 48 or face 50 of slitter 46 can be coated with a film. The coated face is thus operative to tap both the forward propagating and backreflected signals. Note that either coated or uncoated face can tap the light. The faces 48 and 50 can extend in parallel planes, as shown in FIG. 4. However, faces 48 and 50 can be configured to extend in non-parallel planes.

FIG. 5 illustrates photodetector 44, which is configured, for example, as a pin photodiode. The percentage of tapped light Iti can be as small as about half a percent of light signal Ii. However, even such a negligible portion of the Ii signal in powerful laser systems may be detrimental to sensitive photo detectors. To avoid the possibility of destruction of photodiode 44, its surface may have a diffuser 54 formed by applying and cooling a drop of epoxy resin or any other material capable of adequately scattering the incident light. Experimental data shows that diffuser 54 provides for about 3-15 dB attenuation of the reflected signal while backreflecting a negligible portion of the Iti signal. The configuration of photo detectors 44 and 52 is identical and, in addition to being configured as a photodiode, can include any other known photodetecting element which may be provided with diffuser 54. The measurement of oppositely propagating forward and backreflected light signals may be simultaneous or sequential. While two detectors 44 and 52 are shown, only one can be used for measuring the power of light signal propagating in the desired direction, as known to one of ordinary skills in the art.

Returning to FIG. 4, splitter 46 is preferably a relatively thick plate. Accordingly, photo-detectors 44 and 52, respectively, are axially offset relative to one another to accommodate for the thickness of splitter 46.

The above description of the power monitor unit including splitter 46 and photodetectors 44, 52 relates to an optical isolator. However, as readily understood by one of ordinary kills in the laser art, the disclosed power monitor system may be easily associated with other optical elements, as discussed immediately below.

Figure 6B:
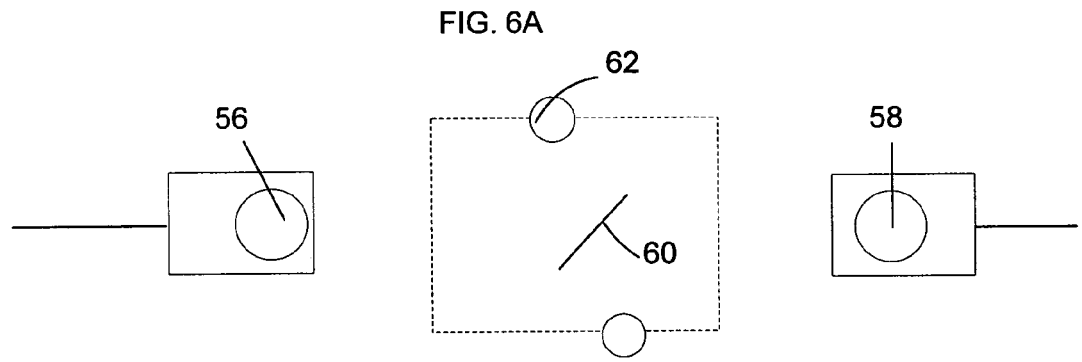
Figure 6C:
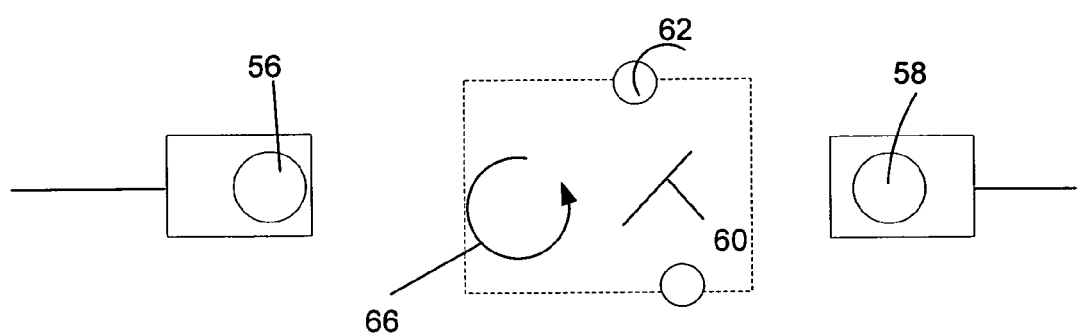

FIG. 6A diagrammatically illustrates an optical system including in part input and output collimators 56, 58, respectively flanking an optical filter 64 and the disclosed power monitor unit which includes a splitter 60 and one or two photodetectors 62. The splitter 60 is configured in accordance with the above disclosed splitter. The optical filter 64 is well known to one of ordinary skills in the laser art and needs not to be disclosed in detail. FIG. 6B diagrammatically illustrates a further application of the disclosed power monitor unit including splitter 60 and photodector(s) 62, which are located between input and output collimators 56, 58, respectively. In this configuration, the disclosed power monitor unit functions simply as a power meter. FIG. 6C diagrammatically illustrates an optical circulator 66 located between input and output collimators 56, 58, respectively, and optically coupled to the disclosed power monitor unit. As readily understood by one of ordinary skills in the laser art, other applications of the disclosed power monitor unit can be easily envisioned.

It will be apparent to those skilled in the art that various modifications and variations can be made in the presently disclosed laser powerful system. Thus, it is intended that the present disclosure cover the modifications and variations of this disclosure provided they come within the scope of the appended claims and their equivalents.

The invention claimed is:

1. A fiber laser system comprising:
   a pigtail optical isolator having a core located along a light path and provided with:
      a plate-shaped beam splitter mounted within the core and having spaced outer sides which face away from one another and are operative to tap off respective portions of forward and backreflected light signals, the tapped off portions propagating along respective tap paths which extend along opposite directions both transverse to the light path; and
      a power monitoring unit mounted within the core and operative to receive the tapped off portions from the respective outer sides so as to monitor a power of the forward and backreflected light signal.

2. The system of claim 1, wherein the opposite outer side of the plate-shaped beam splitter are coated with respective reflective films and extend transversely to the light and tap paths at an angle differing from a right angle.

3. The system of claim 2, wherein the opposite outer sides of the plate-shaped beam splitter are parallel to one another or nonparallel to one another.

4. The system of claim 1, wherein the power monitoring unit is configured with multiple photo-diodes located along the respective tap paths, and each having a diffuser thereon, the diffusers each being impinged upon by the tapped off portion and configured to attenuate the tapped-off portion.

5. A method of monitoring a power of light propagating along a light path within a core of a pigtail isolator, comprising:
   tapping off portions of respective forward-propagating and backreflected-propagating light signals within the core by opposite sides of a plate-shaped beam splitter, the opposite sides facing away from one another and being configured to guide the tapped off portions along respective tap paths which extend in opposite directions and transverse to the light path; and receiving the tapped off portions by a power measuring unit mounted in the core.

6. The method of claim 5 further comprising processing the received tapped off portions simultaneously or sequentially.

7. The system of claim 1, wherein the pigtail isolator is configured with input and output collimators mounted to respective opposite input and output ends of the isolator, and input and output fibers coupled to respective input and output collimators.

* * * * *